US010597816B2

(12) United States Patent
Knaup et al.

(10) Patent No.: US 10,597,816 B2
(45) Date of Patent: Mar. 24, 2020

(54) FLUORINE-CONTAINING WATER-REPELLENT COMPOSITION

(71) Applicant: ARCHROMA IP GMBH, Reinach (CH)

(72) Inventors: Wolfgang Knaup, Burgkirchen (DE); Waltraud Gasafi-Martin, Garching (DE)

(73) Assignee: Archroma IP GmbH, Reinach (CH)

( * ) Notice: Subject to any disclaimer, the term of this patent is extended or adjusted under 35 U.S.C. 154(b) by 441 days.

(21) Appl. No.: 15/323,332

(22) PCT Filed: Jul. 3, 2015

(86) PCT No.: PCT/EP2015/001373
§ 371 (c)(1),
(2) Date: Dec. 30, 2016

(87) PCT Pub. No.: WO2016/000831
PCT Pub. Date: Jan. 7, 2016

(65) Prior Publication Data
US 2017/0130394 A1 May 11, 2017

(30) Foreign Application Priority Data
Jul. 4, 2014 (EP) .................... 14002305

(51) Int. Cl.
C08F 2/44 (2006.01)
C08F 220/18 (2006.01)
C08F 22/20 (2006.01)
C08F 220/14 (2006.01)
C08F 220/20 (2006.01)
C08F 220/26 (2006.01)
C08F 220/32 (2006.01)
D06M 15/277 (2006.01)
D06M 13/02 (2006.01)
C08L 33/10 (2006.01)
C08F 220/24 (2006.01)
C08L 33/16 (2006.01)
D06M 13/224 (2006.01)
D06M 15/248 (2006.01)
D06M 15/273 (2006.01)
D06M 15/29 (2006.01)
C09D 7/63 (2018.01)
C09D 5/00 (2006.01)
C09D 133/06 (2006.01)
C09D 133/08 (2006.01)
C09D 133/12 (2006.01)
D06M 15/263 (2006.01)
C08L 91/06 (2006.01)
C09D 4/00 (2006.01)
C09D 133/16 (2006.01)
C09D 191/06 (2006.01)
C08K 5/01 (2006.01)
D06M 101/06 (2006.01)
D06M 101/32 (2006.01)

(52) U.S. Cl.
CPC ............... D06M 13/02 (2013.01); C08F 2/44 (2013.01); C08F 220/18 (2013.01); C08F 220/24 (2013.01); C08L 33/10 (2013.01); C08L 33/16 (2013.01); C08L 91/06 (2013.01); C09D 4/00 (2013.01); C09D 5/00 (2013.01); C09D 7/63 (2018.01); C09D 133/066 (2013.01); C09D 133/068 (2013.01); C09D 133/08 (2013.01); C09D 133/12 (2013.01); C09D 133/16 (2013.01); C09D 191/06 (2013.01); D06M 13/224 (2013.01); D06M 15/248 (2013.01); D06M 15/263 (2013.01); D06M 15/273 (2013.01); D06M 15/277 (2013.01); D06M 15/29 (2013.01); C08F 2220/1891 (2013.01); C08K 5/01 (2013.01); C08L 2203/12 (2013.01); C08L 2205/025 (2013.01); D06M 2101/06 (2013.01); D06M 2101/32 (2013.01); D06M 2200/01 (2013.01); D06M 2200/11 (2013.01); D06M 2200/12 (2013.01)

(58) Field of Classification Search
CPC ........ C08F 2/44; C08F 220/18; C08F 220/24; C08L 33/10; C08L 33/3316; C08L 91/06
USPC ........................................................ 524/763
See application file for complete search history.

(56) References Cited

U.S. PATENT DOCUMENTS

| 5,021,501 A | 6/1991 | Ohmori et al. |
| 6,395,821 B1 | 5/2002 | Shimada et al. |
| 2004/0010211 A1 | 5/2004 | Boylan |

(Continued)

FOREIGN PATENT DOCUMENTS

| CN | 87104448 A | 2/1988 |
| CN | 1816575 A | 8/2006 |

(Continued)

Primary Examiner — Kelechi C Egwim
(74) Attorney, Agent, or Firm — McBee Moore & Vanik IP, LLC

(57) ABSTRACT

Composition, comprising at least components (A) and (B) and optionally at least one of components (C) to (E):
(A) a polyacrylate obtained in the polymerisation of monomers
   (M1) $CH_2=CR^3COO-R^1$ with
   (M2) $CH_2=CR^3COO-R^2$ and optionally
   (M3) $CH_2=CR^6COO-Y-R_F$
   (M4) $CH_2=CR^3-X-R^4$;
(B) a wax;
(C) a blocked isocyanate;
(D) an organic polysiloxane;
(E) a melamine resin.

20 Claims, No Drawings

(56) References Cited

U.S. PATENT DOCUMENTS

| | | | |
|---|---|---|---|
| 2005/0027063 A1 | 2/2005 | Audenaert et al. | |
| 2007/0009663 A1 | 1/2007 | Wang et al. | |
| 2008/0202384 A1 | 8/2008 | Peng et al. | |
| 2009/0030114 A1 | 1/2009 | Wang et al. | |
| 2014/0045992 A1* | 2/2014 | Hirono | C09K 3/18 524/726 |
| 2014/0051805 A1* | 2/2014 | Shimada | C08F 220/22 524/850 |

FOREIGN PATENT DOCUMENTS

| | | | |
|---|---|---|---|
| CN | 101283007 A | 10/2008 | |
| CN | 101622286 A | 1/2010 | |
| CN | 101765614 A | 6/2010 | |
| CN | 102634981 A | 8/2012 | |
| CN | 102675527 A | 9/2012 | |
| CN | 103396510 A | 11/2013 | |
| CN | 103524670 A | 1/2014 | |
| EP | 1 595 932 A4 | 9/2007 | |
| EP | 2 703 464 A1 | 3/2014 | |
| EP | 2 703 465 A1 | 3/2014 | |
| GB | 1 058 955 A | 2/1967 | |
| GB | 1058955 A * | 2/1967 | C08F 220/24 |
| JP | H08-325933 A | 12/1996 | |
| JP | H09-324173 A | 12/1997 | |
| JP | H09-328677 A | 12/1997 | |
| JP | 2004-262970 A | 9/2004 | |
| JP | 2008-138336 A | 6/2008 | |
| JP | 2011-137253 A | 7/2011 | |
| WO | 2011/122442 A1 | 10/2011 | |
| WO | 2012147573 A1 | 11/2012 | |

* cited by examiner

FLUORINE-CONTAINING WATER-REPELLENT COMPOSITION

CROSS REFERENCE TO RELATED APPLICATIONS

This application is a § 371 National State Application of PCT/EP2015/001373, filed Jul. 3, 2015, which claims priority to European Application No. 14002305.2 filed Jul. 4, 2014.

FIELD OF THE INVENTION

The invention relates to a fluorine-containing composition containing a polyacrylate made from at least three different (meth)acrylic acid esters, one of which is a fluorine-containing (meth)acrylic acid ester, and a paraffin wax, and optionally further ingredients selected from blocked isocyanates, polysiloxanes and melamine resins or mixtures thereof, to a method of making such a composition, to a method of treating a substrate such as a textile with such composition in order to impart water-, oil- and soil-repellent properties to such substrate, and said treated substrate as such. Said composition is based on water and/or an organic solvent.

BACKGROUND OF THE INVENTION

It is known to treat textile fabrics such as wovens, knits or nonwovens with appropriate aqueous dispersions in order to provide them with desirable properties. Such a desired property is, for example, a water-repellent effect, i.e. a hydrophobic effect. In order to obtain water-repellent properties for textiles, it is known to use aqueous dispersions of fluorine-containing products.

EP 1 899 391 relates to aqueous dispersions produced by mixing an extender composition with a fluorinated dispersion to impart oil-, soil- and water-repellency and further surface effects.

EP 1 485 533 B1 relates to preparations based on water and/or organic solvents and use thereof as coating on textile fabrics. The preparations may contain reaction products containing trifluoromethyl groups.

EP 1 424 433 relates to waterborne hydrophobic barrier coatings derived from copolymers of higher vinyl esters. The coatings may contain a fluorine-containing surfactant.

US 2007/0009663 relates to a polymer extender composition which may be blended with fluoropolymers in order to provide surface effects to treated substrates.

OBJECTS OF THE INVENTION

There is an ongoing need in the industry for providing compositions which impart durable water-repellent properties to substrates such as textiles.

SUMMARY OF THE INVENTION

This object is achieved with a composition comprising at least components (A) and (B), wherein component (A) is a polyacrylate made by polymerising at least three different (meth)acrylates, one of which is a fluorine-containing (meth)acrylate, and component (B) is a wax, and water and/or an organic solvent.

Accordingly, in a first aspect, the invention relates to a composition, comprising at least components (A) and (B), and optionally at least one of components (C) to (E):

(A) a polyacrylate obtained in the polymerisation of monomers
  (M1) $CH_2=CR^3COO-R^1$ with
  (M2) $CH_2=CR^3COO-R^2$ and
  (M3) $CH_2=CR^6COO-Y-R_F$, and optionally
  (M4) $CH_2=CR^3-X-R^4$,
(B) a wax;
(C) a blocked isocyanate;
(D) an organic polysiloxane;
(E) a melamine resin;
wherein
  $R^1$ is the alcohol moiety in (meth)acrylate monomer (M1) containing from 1 to 8 carbon atoms;
  $R^2$ is the alcohol moiety in (meth)acrylate monomer (M2) containing from 9 to 40 carbon atoms;
  $R_F-Y$ is the alcohol moiety in (meth)acrylate monomer (M3), wherein
  Y is $-(CH_2)_m-$, wherein m is an integer in the range of from 1 to 10; and
  $R_F$ is $C_xF_{2x+1}$, wherein x is an integer in the range of from 1 to 12, preferably from 1 to 6, more preferably from 4 to 6;
  $R^6$ is selected from H, $CH_3$, Cl, or F;
  $R^3$ in monomer (M1), (M2) and (M4) is independently selected from H, $CH_3$, or $C_2H_5$,
  X in monomer (M4) is COO or CONK
  $R^4$ in monomer (M4) is glycidyl or $CH_2(CH_2)_n-OR^5$, wherein n is an integer in the range of from 1 to 10 and $R^5$ is H or a residue containing from 1 to 6 carbon atoms;
and wherein the composition is based on water and/or an organic solvent.

In one embodiment, $R^1$ contains from 1 to 6 carbon atoms and $R^2$ contains from 12 to 40 carbon atoms.

In a further embodiment, $R^1$ is branched or unbranched or cyclic $C_1$ to $C_6$ alkyl and $R^2$ is branched or unbranched or cyclic $C_{12}$ to $C_{40}$ alkyl.

In a further embodiment, $R^1$ is selected from one or more of the group consisting of methyl, ethyl, n-propyl, iso-propyl, n-butyl, iso-butyl, sec-butyl, tert-butyl, n-pentyl and isomers thereof, n-hexyl and isomers thereof, cyclopropyl, cyclobutyl, cyclopentyl, cyclohexyl; and $R^2$ is selected from one or more of the group consisting of n-dodecyl (lauryl) and isomers thereof, n-tridecyl and isomers thereof, n-tetradecyl (myristyl) and isomers thereof, n-pentadecyl and isomers thereof, n-hexadecyl (cetyl) and isomers thereof, n-heptadecyl and isomers thereof, n-octadecyl (stearyl) and isomers thereof, n-nonadecyl and isomers thereof, n-eicosyl and isomers thereof, n-heneicosyl and isomers thereof, n-docosyl (behenyl) and isomers thereof, n-tricosyl and isomers thereof, n-tetracosyl and isomers thereof, n-pentacosyl and isomers thereof, n-hexacosyl (ceryl) and isomers thereof, n-heptacosyl and isomers thereof, n-octacosyl and isomers thereof, n-nonacosyl and isomers thereof, n-triacontyl (myricyl) and isomers thereof.

In one embodiment, (A) is obtained in the polymerization of
5 to 40% by weight of monomer (M1),
30 to 85% by weight of monomer (M2); and
1 to 50% by weight of monomer (M3); and optionally
0.1 to 20% by weight of monomer (M4);
based on the total amount of (A) (=100% by weight).

In another embodiment, (A) is obtained in the polymerization of
5 to 30% by weight of monomer (M1),
30 to 70% by weight of monomer (M2);
5 to 40% by weight monomer (M3); and optionally
0.1 to 10% by weight of monomer (M4);
based on the total amount of (A) (=100% by weight).

In a further embodiment, wax (B) has a melting point in the range of from 50 to 130° C., preferably 60 to 90° C.

In a further embodiment, wax (B) is a paraffin wax.

In a further embodiment, the composition comprises from
5 to 90% by weight of (A);
5 to 90% by weight of (B);
0 to 40% by weight of (C);
0 to 40% by weight of (D);
0 to 40% by weight of (E);
0.1 to 90% by weight of water and/or an organic solvent;
based on the total amount of the composition (=100% by weight).

In a further embodiment, the composition additionally comprises a component comprising an amphoteric structure such as a betaine and/or an amine N-oxide [Component (F)].

In one embodiment, said composition comprises from
5 to 90% by weight of (A);
5 to 90% by weight of (B);
0 to 40% by weight of (C);
0 to 40% by weight of (D);
0 to 40% by weight of (E);
0.1 to 87% by weight of water and/or an organic solvent;
0.1 to 3% by weight of a component comprising an amphoteric structure [component (F)];
based on the total amount of the composition (=100% by weight).

In a second aspect, the invention relates to a method of making a composition as defined in any one of the preceding claims, comprising at least steps (C1) to (C2):
(C1) homogenizing a mixture comprising at least monomers (M1), (M2), and (M3), and wax (B), and water and/or an organic solvent;
(C2) polymerizing the mixture obtained in step (C1).

In a third aspect, the invention relates to a method of treating a substrate, comprising at least step (S1):
(S1) contacting a substrate with the composition defined in the first aspect or any embodiment disclosed therein, or contacting a substrate with the composition made according to the method defined in the second aspect.

In one embodiment, the substrate is a textile, fiber, fabric, paper, nonwoven, leather, or a combination of two or more thereof.

In one embodiment, the invention relates to the use of a composition as defined in the first aspect in or as a finishing for any textile in the form of a linear formation such as thread and yarn, in the form of a planar formation such as fabric, knitted fabric, knotted fabric, non-woven fabric, felts, or in the form of a spatial formation such as hose and outwear for women, men and children.

In a fourth aspect, the invention relates to a substrate, comprising at least components (A) and (B) as defined in the first aspect.

In one embodiment, the substrate is or has been treated by the method as defined in the third aspect.

In one embodiment, the substrate is in the form of a linear formation such as threads and yarns, in the form of a planar formation such as fabric, knitted fabric, knotted fabric, non-woven fabric, felt, or in the form of a spatial formation such as hoses and outwear for women, men and children; or is a textile, fiber, fabric, paper, nonwoven, leather, or a combination of two or more thereof.

The invention further relates to the use of wax (B) which comprises or consists of a n-paraffin in an amount of from 75 to 95% by weight and one or more of isoparaffin, cycloparaffin or an aromatic compound in an amount of from 5 to 25% by weight based on the total amount of the wax, wherein the n-paraffin has from 20 to 60 carbon atoms, preferably wherein the n-paraffin has a molecular weight of from 300 to 600, in or as a finishing for any textile in the form of a linear formation such as thread and yarn, in the form of a planar formation such as fabric, knitted fabric, knotted fabric, non-woven fabric, felt, or in the form of a spatial formation such as hose and outwear for women, men and children.

DETAILED DESCRIPTION OF THE INVENTION

In the following, all terms in quotation marks are defined in the meaning of the invention.

First Aspect: Composition According to the Invention

In a first aspect, the invention relates to a composition comprising at least components (A) and (B), and optionally at least one of components (C) to (E):
(A) a polyacrylate obtained in the polymerisation of (meth)acrylic acid monomers
   (M1) $CH_2=CR^3COO-R^1$ with
   (M2) $CH_2=CR^3COO-R^2$ and
   (M3) $CH_2=CR^6COO-Y-R_F$, and optionally
   (M4) $CH_2=CR^3-X-R^4$;
(B) a wax;
(C) a blocked isocyanate;
(D) an organic polysiloxane;
(E) a melamine resin;
wherein
$R^1$ is the alcohol moiety in (meth)acrylic acid monomer (M1) containing from 1 to 8 carbon atoms;
$R^2$ is the alcohol moiety in (meth)acrylic acid monomer (M2) containing from 9 to 40 carbon atoms;
$R_F-Y$ is the alcohol moiety in (meth)acrylic acid monomer (M3), wherein
Y is $-(CH_2)_m-$, wherein m is an integer in the range of from 1 to 10; and
$R_F$ is $C_xF_{2x+1}$, wherein x is an integer in the range of from 1 to 12, preferably from 1 to 6, more preferably 4 to 6;
$R^6$ is selected from H, $CH_3$, Cl, or F;
$R^3$ in monomer (M1), (M2), and (M4) is independently selected from H, $CH_3$, or $C_2H_5$,
X in monomer (M4) is COO or CONH;
$R^4$ is glycidyl or $CH_2(CH_2)_n-OR^5$, wherein n is an integer in the range of from 1-10 and
$R^5$ is H or a residue containing from 1 to 6 carbon atoms;
and wherein the composition is based on water and/or an organic solvent.

The term "a polyacrylate (A) obtained in the polymerisation of monomers (M1) with (M2) and (M3), and optionally (M4)" means that said polyacrylate (A) comprises or consists of moieties derived from monomers (M1), (M2), and (M3), and optionally (M4).

Component (A)

Component (A) is the reaction product obtained in a polymerization reaction of monomer (M1) with monomer (M2) and (M3). Optionally, a monomer (M4) may be additionally employed to monomers (M1), (M2) and (M3).

Monomers (M1) and (M2) are acrylic acid esters which are different from one another. The term "different from one another" means that (M1) and (M2) differ at least in the constitution of the ester moiety of the monomers.

Monomer (M3) is a perfluoroalkyl acrylic acid ester.

The term "acrylic acid" encompasses the term "methacrylic acid". Thus, the term "(meth)acrylic acid" encompasses both an acrylic acid or a methacrylic acid.

Monomer (M1)

According to the invention, monomer (M1) is an acrylic acid ester $CH_2=CR^3COO-R^1$ wherein $R^1$ represents a residue containing from 1 to 8 carbon atoms. $R^3$ is selected from the group consisting of H, $CH_3$, or $C_2H_5$.

The term "residue" as used in the definition of monomer (M1) denotes the alcohol moiety of the ester or monomer (M1).

In one embodiment, $R^1$ is a branched or unbranched or cyclic $C_1$ to $C_8$ alkyl group that may be saturated or unsaturated.

Preferably, $R^1$ is selected from the group consisting of methyl, ethyl, n-propyl, iso-propyl, n-butyl, sec-butyl, iso-butyl, tert-butyl, n-pentyl and isomers thereof, n-hexyl and isomers thereof, n-heptyl and isomers thereof, n-octyl and isomers thereof, cyclopropyl, cyclobutyl, cyclopentyl, cyclohexyl, cycloheptyl and cyclooctyl.

Mixtures of different monomers (M1) may also be employed.

The term "isomer" used in connection with $R^1$ encompasses positional isomers.

In one embodiment, $R^1$ represents a residue, i.e. the alcohol moiety of the ester, containing from 1 to 6 carbon atoms.

In one embodiment, $R^1$ is a branched or unbranched or cyclic $C_1$ to $C_6$ alkyl group that may be saturated or unsaturated.

Preferably, $R^1$ is selected from one or more of the group consisting of methyl, ethyl, n-propyl, iso-propyl, n-butyl, iso-butyl, sec-butyl, tert-butyl, n-pentyl and isomers thereof, n-hexyl and isomers thereof, cyclopropyl, cyclobutyl, cyclopentyl, cyclohexyl.

Monomer (M2)

According to the invention, monomer (M2) is an acrylic acid ester $CH_2=CR^3COO-R^2$ wherein $R^2$ represents a residue, i.e. the alcohol moiety of the ester, containing from 9 to 40 carbon atoms. $R^3$ is selected from the group consisting of H, $CH_3$, or $C_2H_5$.

The term "residue" as used in the definition of monomer (M2) denotes the alcohol moiety of the ester or monomer (M2).

In one embodiment, $R^2$ is a branched or unbranched or cyclic $C_9$ to $C_{40}$ alkyl group that may be saturated or unsaturated.

Preferably, $R^2$ is selected from the group consisting of n-nonyl and isomers thereof, n-decyl and isomers thereof, n-undecyl and isomers thereof, n-dodecyl (lauryl) and isomers thereof, n-tridecyl and isomers thereof, n-tetradecyl (myristyl) and isomers thereof, n-pentadecyl and isomers thereof, n-hexadecyl (cetyl) and isomers thereof, n-heptadecyl and isomers thereof, n-octadecyl (stearyl) and isomers thereof, n-nonadecyl and isomers thereof, n-eicosyl and isomers thereof, n-heneicosyl and isomers thereof, n-docosyl (behenyl) and isomers thereof, n-tricosyl and isomers thereof, n-tetracosyl and isomers thereof, n-pentacosyl and isomers thereof, n-hexacosyl (ceryl) and isomers thereof, n-heptacosyl and isomers thereof, n-octacosyl and isomers thereof, n-nonacosyl and isomers thereof, n-triacontyl (myricyl) and isomers thereof.

Mixtures of different monomers (M2) may also be employed.

The term "isomers" used in connection with $R^2$ encompasses positional isomers.

In one embodiment, $R^2$ represents a residue, i.e. the alcohol moiety of the ester, containing from 12 to 40 carbon atoms.

In one embodiment, $R^2$ is a branched or unbranched or cyclic $C_{12}$ to $C_{40}$ alkyl group that may be saturated or unsaturated.

Preferably, $R^2$ is selected from one or more of the group consisting of n-dodecyl (lauryl) and isomers thereof, n-tridecyl and isomers thereof, n-tetradecyl (myristyl) and isomers thereof, n-pentadecyl and isomers thereof, n-hexadecyl (cetyl) and isomers thereof, n-heptadecyl and isomers thereof, n-octadecyl (stearyl) and isomers thereof, n-nonadecyl and isomers thereof, n-eicosyl and isomers thereof, n-heneicosyl and isomers thereof, n-docosyl (behenyl) and isomers thereof, n-tricosyl and isomers thereof, n-tetracosyl and isomers thereof, n-pentacosyl and isomers thereof, n-hexacosyl (ceryl) and isomers thereof, n-heptacosyl and isomers thereof, n-octacosyl and isomers thereof, n-nonacosyl and isomers thereof, n-triacontyl (myricyl) and isomers thereof.

In one embodiment, $R^1$ of monomer (M1) is a branched or unbranched or cyclic $C_1$ to $C_6$ alkyl group and $R^2$ of monomer (M2) is a branched or unbranched or cyclic $C_{12}$ to $C_{40}$ alkyl group, which may be saturated or unsaturated, respectively.

Preferably, $R^1$ is selected from one or more of the group consisting of methyl, ethyl, n-propyl, iso-propyl, n-butyl, iso-butyl, sec-butyl, tert-butyl, n-pentyl and isomers thereof, n-hexyl and isomers thereof, cyclopropyl, cyclobutyl, cyclopentyl, cyclohexyl, and $R^2$ is selected from the group consisting of n-dodecyl (lauryl) and isomers thereof, n-tridecyl and isomers thereof, n-tetradecyl (myristyl) and isomers thereof, n-pentadecyl and isomers thereof, n-hexadecyl (cetyl) and isomers thereof, n-heptadecyl and isomers thereof, n-octadecyl (stearyl) and isomers thereof, n-nonadecyl and isomers thereof, n-eicosyl and isomers thereof, n-heneicosyl and isomers thereof, n-docosyl (behenyl) and isomers thereof, n-tricosyl and isomers thereof, n-tetracosyl and isomers thereof, n-pentacosyl and isomers thereof, n-hexacosyl (ceryl) and isomers thereof, n-heptacosyl and isomers thereof, n-octacosyl and isomers thereof, n-nonacosyl and isomers thereof, n-triacontyl (myricyl) and isomers thereof.

In one embodiment, $R^1$ of monomer (M1) is a branched or unbranched or cyclic $C_1$ to $C_5$ alkyl group and $R^2$ of monomer (M2) is a branched or unbranched or cyclic $C_{14}$ to $C_{40}$ alkyl group, which may be saturated or unsaturated, respectively.

Preferably, $R^1$ is selected from one or more of the group consisting of methyl, ethyl, n-propyl, iso-propyl, n-butyl, iso-butyl, sec-butyl, tert-butyl, n-pentyl and isomers thereof, cyclopropyl, cyclobutyl, cyclopentyl, and $R^2$ is selected from the group consisting of n-tetradecyl (myristyl) and isomers thereof, n-pentadecyl and isomers thereof, n-hexadecyl (cetyl) and isomers thereof, n-heptadecyl and isomers thereof, n-octadecyl (stearyl) and isomers thereof, n-nonadecyl and isomers thereof, n-eicosyl and isomers thereof, n-heneicosyl and isomers thereof, n-docosyl (behenyl) and isomers thereof, n-tricosyl and isomers thereof, n-tetracosyl and isomers thereof, n-pentacosyl and isomers thereof, n-hexacosyl (ceryl) and isomers thereof, n-heptacosyl and isomers thereof, n-octacosyl and isomers thereof, n-nonacosyl and isomers thereof, n-triacontyl (myricyl) and isomers thereof.

Monomer (M3)

According to the invention, monomer (M3) is an acrylic acid ester $CH_2=CR^6COO-Y-R_F$, wherein $R_F-Y$ represents a residue, i.e. the alcohol moiety of the ester. Herein, Y is $-(CH_2)_m-$, wherein m is an integer in the range of from 1 to 10. $R_F$ is $C_xF_{2x+1}$, wherein x is an integer in the range of from 1 to 12, preferably 1 to 6, more preferably 4 to 6. Thus, $R_F$—Y represents a perfluoroalkyl residue.

In one embodiment, $C_xF_{2x+1}$ is branched.

In another embodiment, $C_xF_{2x+1}$ is unbranched.

In one embodiment, x ranges from 1 to 12.

In a preferred embodiment, x ranges from 1 to 6.

In a more preferred embodiment, x is 4, 5 or 6.

In a further preferred embodiment, x=6.

$R^6$ is selected from H, $CH_3$, Cl, or F.

In one embodiment, it is possible to employ more than one of monomers (M3), i.e. mixtures of two or more monomers (M3).

Monomer (M4)

According to the invention, the composition may be prepared in the presence of monomer (M4) which is monomer $CH_2=CR^3$—X—$R^4$.

In one embodiment, monomer (M4) is the glycidylester of an acrylic acid (X=COO and $R^4$=glycidyl).

In another embodiment, monomer (M4) is an ester of an acrylic acid, wherein the ester moiety bears an ether group (X=COO and $R^4=CH_2(CH_2)_n$—$OR^5$), wherein n is an integer in the range of from 1 to 10 and $R^5$ is H or a residue containing from 1 to 6 carbon atoms, preferably a branched or unbranched or cyclic alkyl. Preferably, n ranges from 1 to 4 and $R^5$ is H or a residue containing from 1 to 4 carbon atoms, preferably a branched or unbranched or cyclic alkyl.

In a preferred embodiment, if $R^4=CH_2(CH_2)_n$—$OR^5$, n is an integer in the range of from 1 to 4 and $R^5$ is H or n-butyl or iso-butyl.

In one embodiment, monomer (M4) is hydroxyethyl (meth)acrylate. The term "(meth)acrylate" encompasses both acrylate and methacrylate.

In another embodiment, monomer (M4) is the glycidylester of an acrylic acid amide (X=CONH and $R^4$=glycidyl).

In another embodiment, monomer (M4) is an ester of an acrylic acid amide, wherein the ester moiety bears an ether group (X=CONH and $R^4=CH_2(CH_2)_n$—$OR^5$ wherein n is an integer in the range of from 1 to 10 and $R^5$ is H or a residue containing from 1 to 6 carbon atoms, preferably branched or unbranched or cyclic alkyl. Preferably, n ranges from 1 to 4 and $R^5$ is H or a residue containing from 1 to 4 carbon atoms, preferably branched or unbranched or cyclic alkyl.

Mixtures of different monomers (M4) may also be employed.

In a preferred embodiment of the acrylic ester or the acrylic acid amide of monomer (M4), if $R^4=CH_2(CH_2)_n$—$OR^5$, n is an integer in the range of from 1 to 4 and $R^5$ is H or n-butyl or iso-butyl.

Monomers (M4) bearing a glycidyl group may impart an increased adhesion to substrates bearing groups which may react with said glycidyl group such as hydroxyl or amino groups.

In one embodiment, (A) is obtained in the reaction of 5 to 40% by weight of monomer (M1), 30 to 85% by weight of monomer (M2); and 1 to 50% by weight of monomer (M3); and optionally 0.1 to 20% by weight of monomer (M4);

based on the total amount of (A) (=100% by weight).

In another embodiment, (A) is obtained in the reaction of 5 to 30% by weight of monomer (M1), 30 to 70% by weight of monomer (M2);

5 to 40% by weight monomer (M3); and optionally 0.1 to 10% by weight of (M4);

based on the total amount of (A) (=100% by weight).

Component (B)

According to the invention, component (B) is a wax, preferably a wax having hydrophobic properties, i.e. water-repellent properties.

Basically all known waxes may be employed in the composition according to the invention, i.e. natural waxes, chemically modified waxes and synthetic waxes, provided that they have hydrophobic properties.

The term "wax" as used herein refers to the definition given in the publication "Römpp Chemielexikon, $9^{th}$ edition, vol. 6, page 4972.

Accordingly, natural waxes may be based on vegetable waxes, animal waxes mineral waxes, petrochemical waxes.

A vegetable waxes is e.g. carnauba wax, and an animal wax is e.g. bees wax.

A mineral wax is e.g. ceresin.

Petrochemical waxes may also be used such as petrolatum, paraffin waxes and microwaxes.

Chemically modified waxes are waxes such as montane ester waxes and sasol waxes.

Synthetic waxes are waxes based on polyalkylene and polyethylene glycol.

In a preferred embodiment, the wax is selected such to have a melting point in the range of from 50 to 100° C., more preferred 60 to 90° C., still more preferred 60 to 80° C. The melting point is determined according to ASTM D 938-05/DIN ISO 2207:1983.

Compositions according to the invention comprising waxes having a lower melting range than 50° C. are sometimes less suitable for imparting water-repellency to the textiles to be treated with the aqueous dispersions according to the invention. Waxes with a melting range higher above 100° C. may result in an acceptable water repellence and resistance to washing of the fabrics, but they may give rise to increased viscosity of the aqueous dispersions, so that these dispersions are technically less easy to handle. However, basically, waxes having a melting point in the range of from 100 to 130° C. are also suitable in the composition according to the invention.

Thus, in general, the melting point of the wax according to component (B) may range from 50 to 130° C.

Preferably, the wax is a paraffin wax.

The paraffin wax is a mixture containing n-paraffins having from 20 to 60 carbon atoms as the main component and containing small amount of isoparaffins and/or cycloparaffins and/or aromatic compounds. The n-paraffins preferably have a molecular weight of from 300 to 600.

The molecular weight is determined using gel-permeation chromatography. The distribution of n-paraffins, isoparaffins, cycloparaffins and aromatic compounds may be determined using $^{13}C$ NMR spectroscopy.

In one embodiment, the wax comprises or consists of n-paraffins in an amount of from 75 to 95% by weight and one or more of isoparaffins, cycloparaffins or aromatic compounds in an amount of from 5 to 25% by weight, based on the total amount of the wax (=100% by weight).

E.g., a paraffin wax with a melting range of 68° C. to 74° C. is commercially available (CAS No. 8002-74-2).

Such suitable waxes are commercial available, e.g. Sasolwax 8775, Sasolwax 7040, Sasolwax 3971, Sasolwax 6805, or Sasolwax 2222.

In one embodiment, mixtures of different waxes (B) may be employed.

Component (C) (Optional)

According to the invention, the composition may optionally contain a blocked or partially blocked isocyanate.

The term "blocked isocyanate" encompasses mono-, di- and polyisocyanates in which an isocyanate group has been reacted with blocking agents which upon heating release the isocyanate and the blocking agent. Suitable blocking agents are known in the art such as amines, amides, compounds having an active hydrogen atom or alcohols. If said heating is carried out in the presence of a compound having a functional group that can react with said isocyanate group, such as a hydroxyl or an amino group of a suitable substrate such as a fiber, an improved adhesion may result.

Accordingly, blocked isocyanates, in particular blocked polyisocyanates, present in the composition according to the invention, may impart an increased adhesion to substrates bearing groups such as amine or hydroxyl groups which may react with said blocked isocyanate.

Component (C) may be present in an amount of from 0 to 40% by weight based on the total amount of the composition (=100% by weight).

Such suitable blocked isocyanates are commercial available such like Arkophob DAN, Arkophob SR, and Cassurit FF (all Archroma); Phobol XAN (Huntsman) and Ruco-Guard WEB (Rudolf).

Component (D) (Optional)

According to the invention, the composition may optionally contain an organic polysiloxane resin.

The term "organic polysiloxane" encompasses a compound, in which at least a part of the silicon atoms bears alkyl or aryl groups which in turn may be substituted. The polysiloxane may be cyclic, linear or branched.

Any organic polysiloxane resin known in the art for providing water-repellency to a substrate may be used. Suitable products are e.g. known from DE 10 2013 209 170 and EP 2 152 957.

Component (D) may be present in an amount of from 0 to 40% by weight based on the total amount of the composition (=100% by weight).

Such polysiloxane formulations are commercial available such like Ceraperm SFC (Archroma), Powersoft FE 55 or Wacker Finish WR 210 (both Wacker Chemie, Germany).

Component (E) (Optional)

According to the invention, the composition may optionally contain a melamine resin.

Suitable melamine resins are e.g. resins in which the hydrogen atoms of the amino groups of the melamine moiety are partially or completely substituted by $CH_2O$-alkyl or $CH_2O_2C$-alkyl groups. Such products are e.g. known from U.S. Pat. No. 3,480,579.

Further suitable melamine resins are resins in which the hydrogen atoms of the amino groups of the melamine moiety are partially or completely substituted by saturated or unsaturated, linear, branched and/or cyclic hydrocarbons. Such products are e.g. known from DE 10 2013 209 170.

Component (E) may be present in an amount of from 0 to 40% by weight based on the total amount of the composition (=100% by weight).

Formulations that contain such suitable melamine resins are commercial available such like Cerol EX (Archroma) or Freepel 1225 (Emerald Performance Materials), or Phobotex JVA (Huntsman). Such melamine resins may include a paraffin wax such as component (B).

Water and/or Organic Solvent

According to the invention, the composition is based on water and/or an organic solvent.

The term "based on water and/or an organic solvent" encompasses solutions, emulsions and dispersions of the solid and/or liquid compounds contained in the composition in water and/or an organic solvent. The terms "solutions", "emulsions" and "dispersions" are used interchangeably.

The term "water" encompasses distilled water as well as pipe water.

The term "organic solvent" preferably encompasses solvents which are miscible with water or partially water soluble. Preferred organic water miscible solvents are $C_{1-2}$ alcohols, glycols such as ethylene glycol and propylene glycol, dipropylene glycol or polyethylene glycols, amides such as N-methylformamide and N, N-dimethylformamide.

Partially water soluble solvents are also suitable. Preferred organic solvents are dipropylene glycol dimethylether, methoxy propyl acetate, methoxy butyl acetate (butoxyl), and methoxy methyl butyl acetate.

Preferably, the composition is mainly based on water. The term "mainly" means that the amount of organic solvent is less than 50% by weight, based on the total weight of water and organic solvent (=100% by weight). In a preferred embodiment, the amount of organic solvent is less than 40% by weight; more preferred less than 30% by weight, still more preferred less than 20% by weight, still more preferred less than 10% by weight. In one embodiment, the composition does not contain an organic solvent.

The composition according to the invention may contain from 0.1 to 90% by weight water and/or an organic solvent based on the total amount of the composition (=100% by weight).

In one embodiment, the composition comprises
from 5 to 90% by weight of (A);
from 5 to 90% by weight of (B);
from 0 to 40% by weight of (C);
from 0 to 40% by weight of (D);
from 0 to 40% by weight of (E); and
from 0.1 to 90% by weight of water and/or an organic solvent,
based on the total amount of the composition (=100% by weight).

In one embodiment, the solids content of an aqueous composition according to the invention is in the range of from 10 to 50% by weight, preferably 20 to 40% by weight and still more preferred 25 to 35% by weight, based on the total weight of the composition (=100% by weight).

Furthermore, in one embodiment, the composition contains one or more of the following compounds which frequently are used for imparting water-repellence to a substrate: N-methylol compounds such as N-methylol acrylic amides, or melamine resins bearing N-methylol groups; chlorine-containing products, in particular stemming from monomers such as vinyl chloride or vinylidene dichloride.

Components (A) to (E) are known in the art or may be prepared according to known methods.

Second Aspect: Preparation of the Composition According to the Invention

The composition according to the invention may be prepared by polymerizing monomers (M1), (M2) and (M3) and optionally (M4) in water and/or an organic solvent, and admixing component (B).

Said polymerization may also be conducted in the presence of component (B).

If desired, one or more of further components (C) to (E) that are known as components of textile treatment compositions, may be added, preferably after the polymerization has been terminated.

In a preferred embodiment, the composition according to the invention may be prepared by polymerizing monomers (M1), (M2) and (M3) and optionally (M4), in water and/or an organic solvent in the presence of component (B). If desired, one or more of further components (C) to (E) which are known as components of textile treatment compositions, may be added, preferably after the polymerization has been terminated.

In a preferred embodiment, prior to polymerization, a mixture of (M1), (M2) and (M3), and optionally (M4), and component (B) in water and/or an organic solvent is homogenized. This method is exemplarily explained below:

Wax (B) and monomers (M1), (M2) and (M3), and optionally monomer (M4), are melted, preferably in the presence of a dispersant [as component (F)]. The obtained mixture is dispersed in hot water, e.g. hot water at 85° C., by stirring, e.g. using a Turrax for example. This is followed by high-pressure homogenizing, for example at 400 bars and a temperature of from 80 to 85° C. For this, the obtained heated mixture may be passed through a nozzle or an orifice of a homogenizer. Suitable devices are known in the art. Subsequent to the homogenizing, the dispersion may be cooled down and a polymerization catalyst is added, preferably dispersed or dissolved in water: The dispersion may also be polymerized at elevated temperature such as 80° C. After several hours reaction time at e.g. 50° C. to 80° C., the polymerization is terminated.

Suitable dispersants [component (F)] are known and can be selected from commercially available products such as nonionic surfactants, ethoxylated products, such as ethoxylated alcohols or ethoxylated carboxylic acids. Commercially available cationic-active products may be quaternary ammonium salts or mixtures with such cationic-active products and nonionic products such as mono- or dipropylene glycol. Further suitable dispersants are compounds with amphoteric structures e.g. with betaine and/or amine N-oxide functionalities.

The composition according to the invention preferably contains from 0.1 to 3% by weight, preferably from 0.5 to 3% by weight of dispersant or dispersant mixture based on the total amount of the composition (=100% by weight).

Usually, the copolymerization is carried out as free-radical copolymerization by using a polymerization catalyst. As catalysts for the radical polymerization generally known commercial products are used, which serve as free-radical initiators. In the present invention, inter alia, azo compounds may be used as catalysts. A suitable catalyst is e.g. 2,2'-azobis(2-amidinopropane)dihydrochloride.

The amount of polymerization catalyst employed may be in the range of from 0.1 to 5% by weight, based on the mixture of the monomer (M1) and (M2) and (M3), and optionally (M4) (=100% by weight), preferably 2.5 to 5% by weight.

Accordingly, in one embodiment, the invention relates to a method of making a composition as defined in the first aspect, comprising:

(C1) homogenizing a mixture comprising at least monomers (M1) and (M2) and optionally (M3), and component (B), and water and/or an organic solvent;

(C2) polymerizing the mixture obtained in step (C1).

Preferably, homogenization is performed at a pressure in the range of from 100 to 1,000 bars and a temperature in the range of from 50 to 100° C., preferably by passing the mixture through a nozzle or an orifice.

Preferably, homogenization is performed at a pressure in the range of from 200 to 600 bars and a temperature in the range of from 60 to 90° C.

Suitable homogenizers are known in the art.

Third Aspect: Use of the Composition According to the Invention

The compositions according to the invention are particularly useful for imparting water-, oil- and/or soil-repellency to a substrate.

The term "water-repellency" defines the characteristic of a fiber, yarn or fabric to resist wetting as is defined in AATCC Test Method 11-2010.

The term "oil-repellency" defines the characteristic of a fiber, yarn or fabric to resist a hydrocarbon as is defined in AATCC Test Method 118-2002.

The term "soil-repellency" defines the characteristic of a fiber, yarn or fabric to resist or release soil as is defined in AATCC Test Method 130.

Accordingly, the invention relates to a method of treating a substrate comprising at least step (S1):

(S1) contacting a substrate with the composition defined in the first aspect, or a composition made according to the method defined in the second aspect.

The term "treating a substrate" encompasses terms such as "finishing a substrate", "imparting hydrophobicity to a substrate", "making a substrate water-repellent", "making a substrate dirt resistant" or "coating a substrate".

The contacting of the substrate may be carried out by generally customary methods, such as dunking or dipping the substrate into the composition according to the invention, or by spraying the composition according to the invention onto a substrate, or by brush application or sponge application or via a forced application or by an extraction method. Subsequent to the contacting, the contacted substrate may be dried, and, where appropriate, cured at temperatures in the range of from 140° C. to 190° C. Excellent performance is also achievable at low or even ambient curing conditions, means at temperatures below 100° C. or even at temperatures as low as 50° C.

Preferably, the substrate is a textile, fiber, fabric, paper, nonwoven, leather, or a combination of two or more thereof.

The textiles are preferably made from cotton, polyester, or a cotton/polyester blend, from polyamides, polyimides, polyphenylene sulfide, aramide, polyvinyl chloride, polyacrylnitrile, polyvinyl acetate, polytetrafluoroethylene, polyethylene, polypropylene, polyurethane, elastane, carbon fibers, silicate fibers, glass fibers, basalt fibers, metal fibers, or mixtures of two or more thereof. The textiles are normally wovens, knits or non-wovens.

Accordingly, in general, the composition according to the invention may be used as a finish or finishing for substrates such as textile fabric. Preferably, the substrates are provided in the form of a linear, a planar formation or a spatial formation.

The term "finish" or "finishing" encompasses a composition by means of which water-repellency may be imparted to a substrate. The finishing may be applied to the substrate before or after washing the substrate.

In one embodiment, the composition according to the invention may be used in or as finishing for any textile (=substrate). The textile may be in the form of a linear formation such as threads and yarns, in the form of a planar formation such as fabric, knitted fabric, knotted fabric, non-woven fabric, felts, and in the form of a spatial formation such as hoses and outwear for women, men and children.

In one embodiment, the invention relates to the use of a wax which comprises or consists of a n-paraffin in an amount of from 75 to 95% by weight and one or more of isoparaffin, cycloparaffin and/or an aromatic compound in an amount of from 5 to 25% by weight based on the total amount of the wax, wherein the n-paraffin has from 20 to 60 carbon atoms, preferably wherein the n-paraffin has a molecular weight of from 300 to 600, in or as a finishing for substrates such as textile fabric. Preferably, the substrates are provided in the form of a linear, a planar formation or a spatial formation.

The terms "linear formations", "planar formations" and "spatial formations" are known in the textile industry.

The composition according to the invention may also be applied as finishing for outwear to be washed.

In a fourth aspect, the invention relates to a substrate comprising at least components (A) and (B) as defined in the first aspect.

In one embodiment, said substrate is or has been treated by the method as defined in the third aspect.

EXAMPLES

Examples #1 to #9: Preparation of Compositions According to the Invention 5 g of t-butyl methacrylate and 15 g of stearyl acrylate and 5 g of 2-perfluorohexylethyl methacrylate were added to a hot mixture of 4.8 g Genapol ID 100 [fatty alcohol ethoxylate (Clariant)] and 0.4 g of cetyltrimethylammonium chloride in 10 g dipropylene glycol and 120 g water at appr. 80° C. and were dispersed by stirring. In a separate vessel, 40 g of the paraffin wax (melting range 68 to 74° C.) were melted. The above described dispersion of monomers was added to the molten paraffin wax. After 2 minutes of further dispersing the mixture was two times consequently homogenized by Manton-Gaulin homogenizer equipment (at 400 bars at 85° C.) until a stable emulsion was obtained. The temperature was kept between 75-80° C., and 0.2 g 2,2'-azobis(2-methylpropionamidine)dihydrochloride initiator (Wako V-50) diluted in 1.8 g water was added and the mixture was treated for 6 hours at 75° C. under $N_2$ under a donned reflux condenser. This resulted in approx. 200 g product having an active content of approx. 33% by weight (determined by drying at 120° C./2 h).

Similar to the process described for Example #1, other monomer combinations and paraffin wax types were used to produce stable dispersions. Details are given in Table 1:

TABLE 1

|  | #1 | #2 | #3 | #4 | #5 | #6 | #7 | #8 | #9 |
| --- | --- | --- | --- | --- | --- | --- | --- | --- | --- |
| t-BuMA | 2.5 |  | 1.5 |  |  |  | 2.5 | 1 | 2.5 |
| i-BuMA |  |  |  | 1 |  |  |  |  |  |
| MMA | — | 2.5 |  |  | 2.5 |  |  |  |  |
| HexAC | — |  |  |  |  | 4 |  |  |  |
| SA | 7.5 |  | 8.5 |  | 7.5 | 6.5 | 7.5 |  |  |
| BeMA |  | 10 |  |  |  |  | 5 | 5 | 12.5 |
| LA |  |  |  | 10 |  |  |  |  |  |
| FMA | 5 | 3 | 3 |  | 4 | 12 | 8 | 12 | 10 |
| FCA |  |  |  | 10 |  |  |  |  |  |
| HEMA |  |  | 0.2 |  | 0.2 | 0.1 | 1.0 |  |  |
| GMA |  |  | 0.2 | 0.4 | 0.1 | 0.1 |  | 0.1 |  |
| HBAC |  |  |  |  |  |  |  | 0.1 |  |
| paraffin wax | 20 | 17.5 | 20 | 15 | 20 | 20 | 10 | 25 | 7.5 |

(t-BuMA = tert. Butylmethacrylate; i-BuMA = iso-butylmethacrylate; MMA = methylmethacrylate; HexAC = hexylacrylate; SA = stearylacrylate; BeMA = behenylacrylate; LA = laurylacrylate; HEMA = hydroxyethylmethacrylate; GMA = glycidylmethacrylate; HBAC = hydroxybutylacrylate; paraffin wax: Sasolwax 8775; FMA = $C_6F_{13}C_2H_4OCOC(CH_3)=CH_2$; FAC = $C_6F_{13}C_2H_4OCOCH=CH_2$)

Example #10: This Example Describes the Treatment of Textile Fabric with the Dispersions Prepared as Per Examples #1 to #9

A woven 100% polyester fabric (100 g/m²) and a woven 100% cotton fabric (200 g/m²) were treated.

The cotton fabric was treated in a pad-mangle with liquor containing 1 g/l acetic acid, 20 g/l of a cellulose crosslinker and 70 g/l of the dispersions of Examples #1 to #9. Typical weight pick-up of the liquor was 80 percent.

The polyester fabric was padded with liquor containing 1 g/l acetic acid, 1 g/l of a wetting agent, and 40 g/l of dispersion of Examples #1 to #9. Typical weight pick-up was 60 percent. After padding, the fabrics were dried at 160° C. for 3 minutes.

The finished fabrics obtained as per Example #10 were subjected to a water spray test as per AATCC 22-2010, ISO 4920 (EN 24920) and an oil-repelling test as per AATCC Test Method 118-2002, original, i.e. initial, and after 10 wash cycles (DIN ISO 6330) at 40° C. After the washing cycles, the fabrics were tumble dried before spray testing. Typical tumble drying temperature was 60 to 65° C. for 30 minutes.

| Polyester (water spray test/oil-repelling test) | | | | | | | | | |
| --- | --- | --- | --- | --- | --- | --- | --- | --- | --- |
| | Example | | | | | | | | |
| Application 40 g/l | #1 | #2 | #3 | #4 | #5 | #6 | #7 | #8 | #9 |
| Initial | 100/4 | 100/3 | 100/3 | 100/5 | 100/3 | 100/5 | 100/4 | 100/5 | 90/5 |
| 10x wash cycles | 90/3 | 90/2 | 90/2 | 80/4 | 100/3 | 80/4 | 80/3 | 90/4 | 70/4 |

| Cotton (water spray test/oil-repelling test) | | | | | | | | | |
|---|---|---|---|---|---|---|---|---|---|
| Application 70 g/l | #1 | #2 | #3 | #4 | #5 | #6 | #7 | #8 | #9 |
| Initial | 100/4 | 100/3 | 100/3 | 100/5 | 100/4 | 100/6 | 100/4 | 100/5 | 90/5 |
| 10x wash cycles | 80/2 | 70/2 | 80/2 | 80/3 | 80/2 | 70-80/4 | 80/2 | 90/3 | 70/3 |

The examples showed on polyester even at low add-on very good water- and oil-repellent effects even after washing. For cotton very good initial effects were achieved.

By addition of an additional crosslinker such as Cassurit FF to the application bath, the durability of the water- and oil-repellent effect on polyester, but especially on cotton fabric, could further be improved.

| Cotton (water spray test/oil-repelling test) | | | | | | | | | |
|---|---|---|---|---|---|---|---|---|---|
| Application 70 g/l + 10 g/l Cassurit FF | #1 | #2 | #3 | #4 | #5 | #6 | #7 | #8 | #9 |
| Initial | 100/4 | 100/3 | 100/4 | 100/5 | 100/5 | 100/6 | 100/5 | 100/5 | 100/5 |
| 10x wash cycles | 90/3 | 90/3 | 100/3 | 90/4 | 100/5 | 80-90/5 | 90/5 | 90/4 | 80/4 |

| Polyester (water spray test/oil-repelling test) | | | | | | | | | |
|---|---|---|---|---|---|---|---|---|---|
| Application 40 g/l + 5 g/l Cassurit FF | #1 | #2 | #3 | #4 | #5 | #6 | #7 | #8 | #9 |
| Initial | 100/4 | 100/4 | 100/4 | 100/5 | 100/4 | 100/5 | 100/5 | 100/5 | 100/5 |
| 10x wash cycles | 100/3 | 100/3 | 100/3 | 90/3 | 100/3 | 90/4 | 90/3 | 100/4 | 80-90/4 |

Similar improvement of the durability of the water- and oil-repellent effect was achieved by adding 20 g/l of a melamine resin formulation (e.g. Cerol EX or Freepel 1225) to the application bath.

Despite the fact that fabrics treated with formulations of Examples #1 to #9 offer already a good hand feeling, sometimes it is desirable to give the treated fabric a special extra soft hand feeling. This can be achieved by adding in addition to the application bath a softener formulation based on an organic polysiloxane such as Ceraperm SFC.

| Polyester (water spray test/oil-repelling test) | | | | | | | | | |
|---|---|---|---|---|---|---|---|---|---|
| Application 40 g/l + 5 g/l Cassurit FF + 15 g/l Ceraperm SFC | #1 | #2 | #3 | #4 | #5 | #6 | #7 | #8 | #9 |
| Initial | 100/4 | 100/4 | 100/4 | 100/5 | 100/4 | 100/5 | 100/5 | 100/5 | 100/5 |
| 10x wash cycles | 90/3 | 90/3 | 90/3 | 80/3 | 90/3 | 80/4 | 80/3 | 90/4 | 70-80/4 |

Besides a very soft comfortable hand feeling, very good initial and durable water- and oil-repellency is achieved.

The invention claimed is:

1. A composition, comprising components (A) and (B) and optionally at least one of components (C) to (E):
 (A) a polyacrylate obtained in the polymerisation of monomers consisting of
  (M1) $CH_2=CR^3COO-R^1$
  (M2) $CH_2=CR^3COO-R^2$
  (M3) $CH_2=CR^6COO-Y-R_F$ and optionally
  (M4) $CH_2=CR^3-X-R^4$;
 (B) a wax;
 (C) a blocked isocyanate;
 (D) an organic polysiloxane;
 (E) a melamine resin;
wherein
 $R^1$ is an alcohol moiety in (meth)acrylate monomer (M1) containing from 1 to 8 carbon atoms;
 $R^2$ is an alcohol moiety in (meth)acrylate monomer (M2) containing from 9 to 40 carbon atoms;
 $R_F-Y$ is an alcohol moiety in (meth)acrylate monomer (M3), wherein
 Y is $-(CH_2)_m-$, wherein m is an integer in a range of from 1 to 10; and
 $R_F$ is $C_xF_{2x+1}$, wherein x is an integer in a range of from 1 to 12;
 $R^6$ is selected from the group consisting of H, $CH_3$, Cl, and F;
 $R^3$ in monomer (M1), (M2) and (M4) is independently selected from the group consisting of H, $CH_3$, and $C_2H_5$;

X in monomer (M4) is COO or CONH;
R$^4$ is glycidyl or CH$_2$(CH$_2$)$_n$—OR$^5$, wherein n is an integer in a range of from 1 to 10 and R$^5$ is H or a residue containing from 1 to 6 carbon atoms;
and wherein the composition comprises water and/or an organic solvent.

2. The composition according to claim 1, wherein R$^1$ contains from 1 to 6 carbon atoms and R$^2$ contains from 12 to 40 carbon atoms.

3. The composition according to claim 1, wherein R$^1$ is branched or unbranched or cyclic C$_1$ to C$_6$ alkyl and R$^2$ is branched or unbranched or cyclic C$_{12}$ to C$_{40}$ alkyl.

4. The composition according to claim 1, wherein R$^1$ is selected from one or more of the group consisting of methyl, ethyl, n-propyl, iso-propyl, n-butyl, iso-butyl, sec-butyl, tert-butyl, n-pentyl and isomers thereof, n-hexyl and isomers thereof, cyclopropyl, cyclobutyl, cyclopentyl, and cyclohexyl; and R$^2$ is selected from one or more of the group consisting of n-dodecyl (lauryl) and isomers thereof, n-tridecyl and isomers thereof, n-tetradecyl (myristyl) and isomers thereof, n-pentadecyl and isomers thereof, n-hexadecyl (cetyl) and isomers thereof, n-heptadecyl and isomers thereof, n-octadecyl (stearyl) and isomers thereof, n-nonadecyl and isomers thereof, n-eicosyl and isomers thereof, n-heneicosyl and isomers thereof, n-docosyl (behenyl) and isomers thereof, n-tricosyl and isomers thereof, n-tetracosyl and isomers thereof, n-pentacosyl and isomers thereof, n-hexacosyl (ceryl) and isomers thereof, n-heptacosyl and isomers thereof, n-octacosyl and isomers thereof, n-nonacosyl and isomers thereof, and n-triacontyl (myricyl) and isomers thereof.

5. The composition according to claim 1, wherein (A) is obtained in the polymerization of
5 to 40% by weight of monomer (M1);
30 to 85% by weight of monomer (M2);
1 to 50% by weight of monomer (M3); and optionally
0.1 to 20% by weight of monomer (M4);
based on a total amount of (A) (=100% by weight).

6. The composition according to claim 1, wherein (A) is obtained in the polymerization of
5 to 30% by weight of monomer (M1);
30 to 70% by weight of monomer (M2);
5 to 40% by weight of monomer (M3); and optionally
0.1 to 10% by weight of (M4);
based on a total amount of (A) (=100% by weight).

7. The composition according to claim 1, wherein wax (B) has a melting point in a range of from 50 to 130° C.

8. The composition according to claim 1, wherein wax (B) has a melting point in a range of from 60 to 90° C.

9. The composition according to claim 1, wherein wax (B) is a paraffin wax.

10. The composition according to claim 1, wherein the composition comprises from
5 to 90% by weight of (A);
5 to 90% by weight of (B);
0 to 40% by weight of a blocked isocyanate (C);
0 to 40% by weight of an organic polysiloxane (D);
0 to 40% by weight of a melamine resin (E);
0.1-90% by weight of water and/or the organic solvent;
based on a total amount of the composition (=100% by weight).

11. A method of making the composition according to claim 1, comprising (C1) to (C2):
(C1) homogenizing a mixture comprising monomers consisting of (M1), (M2), (M3) and optionally (M4), and wax (B), and water and/or an organic solvent;
(C2) polymerizing the mixture obtained in (C1).

12. A method of treating a substrate, comprising (S1):
(S1) contacting the substrate with the composition according to claim 1.

13. A substrate, coated with a composition according to claim 1.

14. The substrate according to claim 13, wherein the substrate is in a form of a linear formation, in a form of a planar formation, or in a form of a spatial formation; or wherein the substrate is a textile, fiber, fabric, paper, nonwoven, leather, or a combination of two or more thereof.

15. The method according to claim 12, wherein the substrate is in a form of a linear formation, in a form of a planar formation, or in a form of a spatial formation; or wherein the substrate is a textile, fiber, fabric, paper, nonwoven, leather, or a combination of two or more thereof.

16. The composition according to claim 10, wherein (C) is present.

17. A composition comprising components (A) and (B) and optionally at least one of components (C) and (E):
(A) a polyacrylate obtained in the polymerisation of monomers
(M1) CH$_2$=CR$^3$COO—R$^1$
(M2) CH$_2$=CR$^3$COO—R$^2$
(M3) CH$_2$=CR$^6$COO—Y—R$_F$ and optionally
(M4) CH$_2$=CR$^3$—X—R$^4$;
(B) a wax;
(C) a blocked isocyanate;
(D) an organic polysiloxane;
(E) a melamine resin;
wherein
R$^1$ is an alcohol moiety in (meth)acrylate monomer (M1) containing from 1 to 8 carbon atoms;
R$^2$ is an alcohol moiety in (meth)acrylate monomer (M2) containing from 9 to 40 carbon atoms;
R$_F$—Y is an alcohol moiety in (meth)acrylate monomer (M3), wherein
Y is —(CH$_2$)$_m$—, wherein m is an integer in a range of from 1 to 10; and
R$_F$ is C$_X$F$_{2X+1}$, wherein x is an integer in a range of from 1 to 12;
R$^6$ is selected from the group consisting of H, CH$_3$, Cl, and F;
R$^3$ in monomer (M1), (M2) and (M4) is independently selected from the group consisting of H, CH$_3$, and C$_2$H$_5$;
X in monomer (M4) is COO or CONH;
R$^4$ is glycidyl or CH$_2$(CH$_2$)$_n$—OR$^5$, wherein n is an integer in a range of from 1 to 10 and R$^5$ is H or a residue containing from 1 to 6 carbon atoms;
and wherein the composition comprises water and/or an organic solvent,
wherein the composition comprises from
5 to 90% by weight of (A);
5 to 90% by weight of (B);
0 to 40% by weight of a blocked isocyanate (C);
0 to 40% by weight of an organic polysiloxane (D);
0 to 40% by weight of a melamine resin (E);
0.1-90% by weight of water and/or the organic solvent;
based on a total amount of the composition (=100% by weight),
wherein (D) is present.

18. The composition according to claim 1, wherein (M4) is present, wherein R4 is CH$_2$(CH$_2$)$_n$—OR$^5$, and wherein n is an integer in a range from 1 to 4 and R$^5$ is H or a residue containing from 1 to 4 carbon atoms.

19. The composition according to claim 1, wherein (E) is present.

20. The substrate according to claim 13, wherein the substrate is a textile.

\* \* \* \* \*